United States Patent
Dowdell

[19]

[11] Patent Number: 6,106,468
[45] Date of Patent: Aug. 22, 2000

[54] ULTRASOUND SYSTEM EMPLOYING A UNIFIED MEMORY

[75] Inventor: Charles R Dowdell, Nashua, N.H.

[73] Assignee: Agilent Technologies, Inc., Palo Alto, Calif.

[21] Appl. No.: 09/286,544

[22] Filed: Apr. 5, 1999

[51] Int. Cl.⁷ ........................................................ A61B 8/00
[52] U.S. Cl. ........................................................... 600/443
[58] Field of Search .............................. 600/437, 440–443, 600/447, 459; 128/916

[56] References Cited

U.S. PATENT DOCUMENTS

| | | | |
|---|---|---|---|
| 5,492,125 | 2/1996 | Kim et al. | 600/443 |
| 5,630,421 | 5/1997 | Barlow et al. | 600/459 |
| 5,709,209 | 1/1998 | Friemel et al. | 600/447 |
| 5,795,297 | 8/1998 | Daigle | 600/447 |
| 5,817,024 | 10/1998 | Ogle et al. | 600/447 |
| 5,971,923 | 10/1999 | Finger | 600/437 |

*Primary Examiner*—Francis J. Jaworski

[57] ABSTRACT

An ultrasound system incorporating the invention includes a front end that converts ultrasound backscatter signals to lines of digital data values. Those data values are then fed, under control of a front end controller, to plural processing modules which convert them into video displayable data. A memory is utilized to store processed results of each of the plural processing modules and operates as a shared memory that enables the various processing modules to communicate data therebetween. A memory controller enables each respective one of the plural processing modules to access processed results from the shared memory that were stored therein by a processing module whose function preceded, in time, the processing module performing the access. Thereafter, the processing module operates upon the data and writes it back to the shared memory, for use by a succeeding one of the plural processing modules.

19 Claims, 2 Drawing Sheets

ULTRASOUND SYSTEM EMPLOYING A UNIFIED MEMORY

FIELD OF THE INVENTION

This invention relates to medical ultrasound systems which operate in real time and, more particularly, to such a medical ultrasound system which employs a unified memory to service all of the principal subcomponents within the ultrasound system.

BACKGROUND OF THE INVENTION

Prior art medical ultrasound systems comprise many subsystems, each subsystem needing to move data to a next subsystem for processing. A typical ultrasound system will employ first-in/first-out (FIFO) memory buffers for both receiving data from a preceding subsystem and for transferring data to a succeeding subsystem. Classically, each subsystem embodies the FIFO buffers via a dedicated memory device that is either housed with the subsystem or is directly tied to the subsystem for exclusive use thereof.

Such ultrasound systems have employed a parallel bus arrangement to enable communications between the various subsystems, the parallel bus provided with a number of slots to which the various subsystems could be coupled. Accordingly, subsystems which occupied slots on the bus passed data from one to another by transmitting and receiving data frames via the FIFO buffers.

While the use of a dedicated physical memory device for each subsystem insures that each has adequate access to its own specific data elements, a number of disadvantages are present in this design approach. Because multiple distinct physical memory devices are thus required, they are less able to meet changing system requirements in a cost effective manner (due to the need to change the multiple memory devices in the event of certain system modifications). Further, the multiple distinct physical memory devices exhibited a failure, size, weight, cost and power usage matrix that was less than optimal. For instance, the use of individual FIFO buffers for each subsystem allows only one read or one write memory access to occur at a give time in a given buffer. This constraint prevents certain functions from being performed in an overlapping manner and acts to reduce the overall processing time of the system.

Accordingly, there is a need for an ultrasound system that exhibits improved memory operation and utilization; that enables functions within the ultrasound system to be performed on an asynchronous, overlapping basis; and that makes use of relatively inexpensive commodity-type memory products.

SUMMARY OF THE INVENTION

An ultrasound system incorporating the invention includes a front end that converts ultrasound backscatter signals to lines of digital data values. Those data values are then fed, under control of a front end controller, to plural processing modules which convert them into video displayable data. A memory is utilized to store processed results of each of the plural processing modules and operates as a shared memory that enables the various processing modules to communicate data therebetween. A memory controller enables each respective one of the plural processing modules to access processed results from the shared memory that were stored therein by a processing module whose function preceded, in time, the processing module performing the access. Thereafter, the processing module operates upon the data and writes it back to the shared memory, for use by a succeeding one of the plural processing modules.

DETAILED DESCRIPTION OF THE PREFERRED EMBODIMENT

Figure 1:
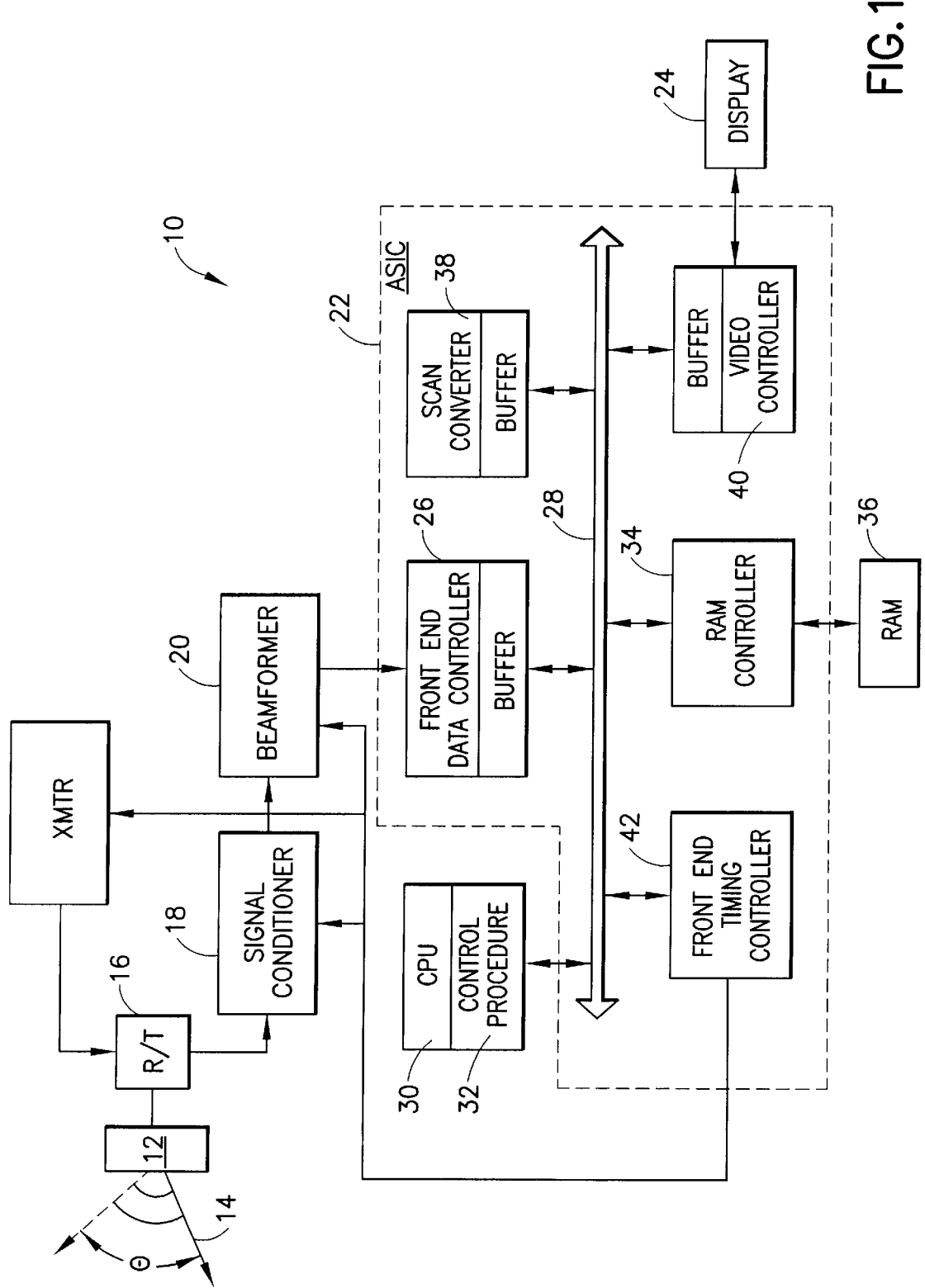
FIG. 1 is a block diagram of a system incorporating the invention.

Referring to the FIG. 1, ultrasound system 10 includes a transducer 12 which, in the known manner, scans an ultrasound beam 14 through an angle $\Theta$. Backscattered signals are sensed by transducer 12 and are fed through a received/transmit switch 16 to a signal conditioner 18 and, in turn, to a beamformer 20. Signal conditioner 18 receives the backscattered ultrasound analog signals and conditions those signals by amplification and forming circuitry prior to their being fed to beamformer 20. Within beamformer 20, the ultrasound signals are converted to digital values and are configured into "lines" of digital data values in accordance with amplitudes of the backscattered signals from points along an azimuth of beam 14.

Beamformer 20 feeds the digital values to an application specific integrated circuit (ASIC) 22 which incorporates the principal processing modules required to convert the digital values into video displayable data for feed to a display 24.

A front end data controller 26, receives the lines of digital data values from beamformer 20 and buffers each line, as received, in a register. After accumulating a line of digital data values, front end data controller 26 dispatches an interrupt signal via a bus 28 to a shared central processing unit (CPU) 30. CPU 30 executes a control procedure 32 that is operative to enable individual, asynchronous operation of each of the processing modules within ASIC 22. More particularly, upon receiving the interrupt signal, CPU 30 causes the line of digital data values data residing in front end data controller 26 to be fed to random access memory (RAM) controller 34 for storage in an external random access memory 36.

As will hereafter be understood, RAM 36 may comprise one or plural memory modules, but all such memory modules are operated under control of RAM controller 34 and, as such, thereby constitute a unified, shared memory. RAM 36 is thus enabled to store instructions and data for CPU 30, lines of RF digital data values and is configured to comprise image buffers for data being transferred between individual modules in ASIC 22 and acoustic two dimensional image frames which are to be fed to display 24, all under control of RAM controller 34.

A front end timing controller 42 is operated by control procedure 32 to output timing signals to each of transmitter 44, signal conditioner 18 and beam former 20 so as to synchronize their operations with the operations of the modules within ASIC 22. Front end timing controller 42 further issues timing signals which control the operation of bus 28 and various other functions within ASIC 22.

As aforesaid, control procedure 32 operates CPU 30 to enable front end data controller 26 to move the lines of digital data values into RAM controller 34 where they are then stored in RAM 36. Since CPU 30 controls the transfer of lines of digital data values, it senses when an entire image frame has been stored in RAM 36. At this point, CPU 30, in conjunction with control procedure 32, recognizes that data is now available for operation by scan converter 38. CPU 30 thus notifies scan converter 38 that it can access the frame of data from RAM 36 for processing.

To access the data in RAM 36 (via RAM controller 34), scan converter 38 interrupts CPU 30 to request a line of the data frame from RAM 36. Such data is then transferred to scan converter 38, and is processed to put it into a displayable form. This process is repeated for each subsequent line of digital data values of the image frame from RAM 36. The resulting processed data is fed, via RAM controller 34, into RAM 36 as video-ready data. CPU 30 and control procedure 32, via the interrupt procedure described above, sense the completion of the operation of scan converter 38. Video controller 40, on a continuing basis, interrupts CPU 30 which responds by causing a feed of lines of video data thereto from RAM 36 for display by display monitor 24.

Figure 2:
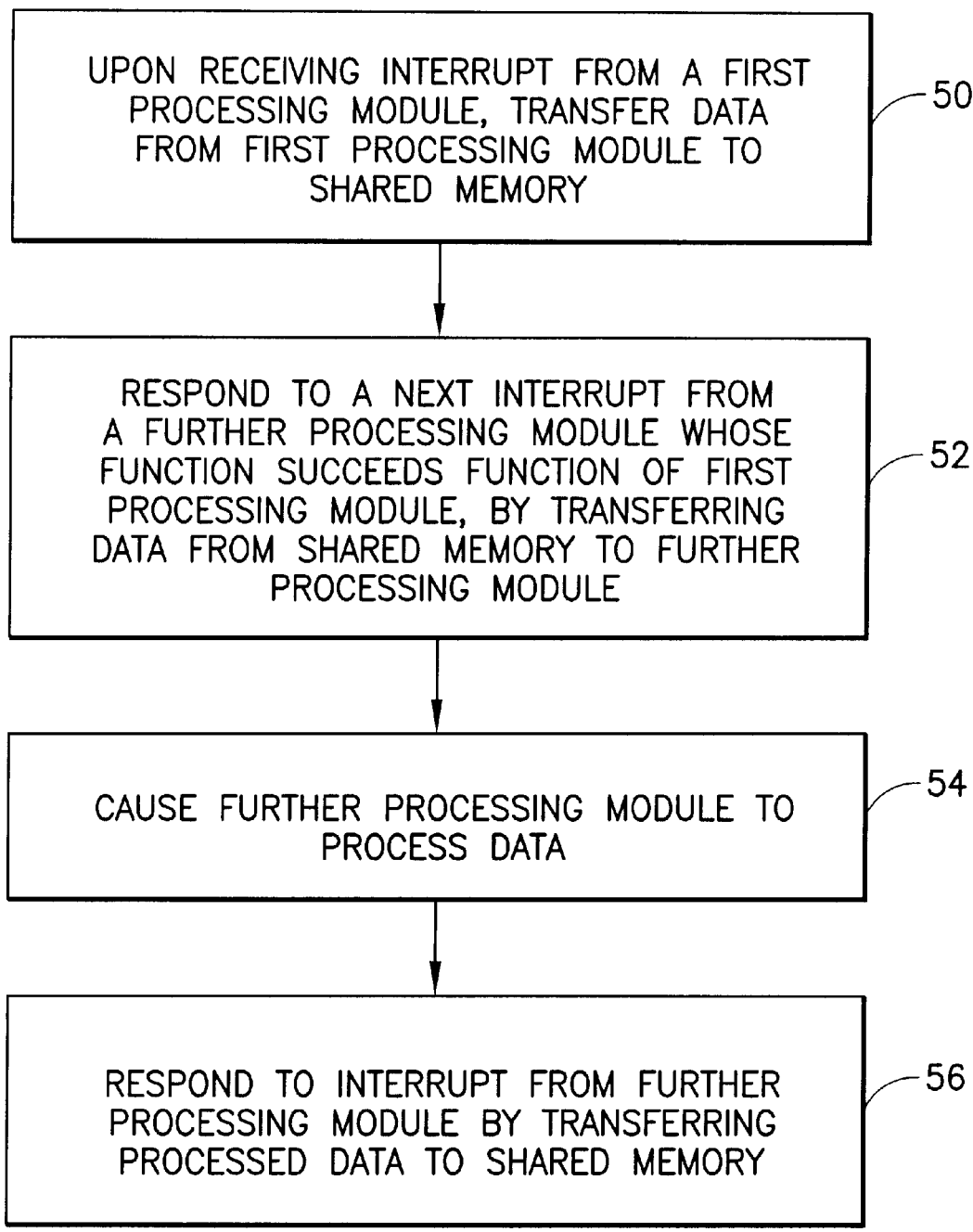
FIG. 2 is a logical flow diagram illustrating the method of the invention.

The method of the system is illustrated in FIG. 2. In brief, CPU 30 responds to an interrupt signal from one of the processing modules, operating RAM controller 34 to enable a transfer of data from the processing module to shared memory 36 (step 50). This makes the data available to a further processing module whose function succeeds the function performed by the first processing module. CPU 30 responds to a further interrupt signal by causing RAM controller 34 to enable a further one of the processing modules to access the processed data from shared memory 36 (step 52), and to operate upon the processed results (step 54) and to then store resulting processed data again in the shared memory (step 56).

Note that each of front end data controller 26, scan converter 38 and video controller 40 incorporates a buffer of sufficient size to accept high bandwidth data from RAM 36. That data is then processed at a lower rate by the respective processing modules in ASIC 22. This feature plus the fact that RAM 36 is employed as the principal communication pathway between CPU 30 and the remaining processing modules in ASIC 22, enables CPU 30 to arrange the data path through the processing modules in any manner desired to achieve a selected image presentation. For instance, if color attributes are to be added to the image data to illustrate flow velocities, a color software process running on CPU 30 can be inserted between the processing procedures carried out in ASIC 22. Thus, data from RAM 36 can be downloaded to CPU 30, processed for color and then returned to RAM 36, ready for processing by a further processing module.

The system arrangement shown in FIG. 1 enables high speed internal data movements between the individual modules in ASIC 22. Bus 28 allows data transfers at a rate of 480 megabytes per second (for example). That data transfer rate is much higher than is needed to accommodate the bandwidth required for the processing elements within ASIC 22. The substantial bus capacity allows the processing elements to utilize shared memory 36 without conflicts.

For instance and as indicated above, bus 28 accomplishes transfers of data at a multi megabyte per second rate, whereas the output from video controller 40 to display monitor 24 is one frame each 16.6 milliseconds. Further, front end data controller 26 collects input data every 60–400 microseconds from beamformer 20. Accordingly, the data input and output rates to/from ASIC 22 are relatively slow compared to the internal data movements within ASIC 22. Thus, considerable processing can be carried on with respect to the received ultrasound lines of digital data values during and between both input or output of data to/from ASIC 22.

Further, while each of the principal processing elements operates on an interrupt-driven basis, it is preferred that scan converter 38 be enabled to move its video data into RAM 36, utilizing a direct memory access. However, it is to be understood that the data feed from scan converter 38 to RAM 36 is still paced by the rate of its input data, as controlled by CPU 30. In essence therefore, each of the modules within ASIC 22 operates upon input data in a logically parallel, pipeline manner utilizing RAM 36 as the shared repository for stored, processed intermediate and final video data.

It is to be understood that while the modules within ASIC 22 operate and are controlled by interrupt signals, that the asynchronous manner of their operation enables a request signal that is generated by a module to be ignored by control procedure 32 until a preceding procedure has transferred its processed data into RAM 36, thereby enabling that data to be available for the subsequent processing to be accomplished by the following module.

The system design shown in FIG. 1 enables CPU 30 to have access to all subsystem memory and allows a tailored mix of hardware/software processing that can evolve as CPU performance grows and system enhancements are provided. Further, the use of a unified shared memory 36 enables highly reliable commodity memory devices to be used to populate RAM 36, assuring increased reliability and decreased cost. The unified memory can be tailored by system software to meet aggregate size and data access requirements of each modular subsystem within ultrasound system 10.

It should be understood that the foregoing description is only illustrative of the invention. Various alternatives and modifications can be devised by those skilled in the art without departing from the invention. For example, the independent arrangement of the various processing modules in ASIC 22 and the fact that they use RAM 36 as the common interface, enables CPU 30 to organize their processing functions in an arbitrary manner. Thus, if desired, a same processing module can be use to process the image data plural times if necessary. Accordingly, the present invention is intended to embrace all such alternatives, modifications and variances which fall within the scope of the appended claims.

What is claimed is:

1. An ultrasound system comprising:

front-end means for converting ultrasound backscatter signals to digital data values;

means for converting said digital data values to lines of digital data values;

plural processing modules for converting said lines of digital data values into video displayable data each processing module operational to process said lines of digital data values in accord with a specific function of a series of required functions to enable creation of displayable data;

a shared memory for storing processed results of each of said plural processing modules;

means for coupling said shared memory and said plural processing modules and for enabling data transfers therebetween; and control means for enabling each respective one of said plural processing modules to access processed results from said shared memory, on a line by line basis, stored therein by a processing module whose function precedes a function to be performed by said each respective one of said plural processing modules, and to operate upon said processed results and store resulting processed data in said shared memory on a line by line basis.

2. The ultrasound system as recited in claim 1, wherein said control means incorporates a software-driven processing function, said control means enabled to access data from said shared memory and to subject said data to said software driven processing function and to thereafter return said data, after processing, back to said shared memory for access by one of said plural processing modules.

3. The ultrasound system as recited in claim 1, wherein said means for coupling is a bus system that is operated to enable data transfers between each of said plural processing modules and said shared memory at a data transfer rate that is sufficient to prevent conflicts between said processing modules when accessing said shared memory.

4. The ultrasound system as recited in claim 1, wherein said control means comprises a processor, and each said processing module issues an interrupt signal to said processor at completion of a function being executed thereby, said processor responding to an interrupt signal by enabling a further processing module to perform a next function in said series of required functions.

5. The ultrasound system as recited in claim 1, wherein said functional modules include at least a scan converter for converting received lines of ultrasound digital data to two dimensional scan data, and a video controller for converting said scan data to video display-ready data.

6. The ultrasound system as recited in claim 5, wherein said scan converter, said video controller, a controller for said shared memory and said means for converting are each incorporated into an application specific integrated circuit.

7. The ultrasound system as recited in claim 1, further including a processor, said processor also employing said shared memory for storage of instructions and data.

8. A method for operating an ultrasound system that includes front-end means for converting ultrasound backscatter signals to digital data values, means for converting said digital data values to lines of digital data values, a central processor, plural processing modules for converting said lines of digital data values into video displayable data, each processing module operational to process said lines of digital data values in accord with a specific function of a series of required functions to enable creation of displayable data, and a shared memory for storing processed results of each of said plural processing modules, said method comprising the steps of:

a) responding to an interrupt signal from a first processing module to enable transfer of data from said first processing module to said shared memory, on a line by line basis, so as to make said data available to a further processing module whose function succeeds a function performed by said first processing module; and b) responding to a further interrupt signal by enabling a further one of said further processing module to access said processed data from said shared memory, on a line by line basis, and to operate upon said processed results and to store resulting processed data again in said shared memory.

9. The method as recited in claim 8, wherein said plural processing modules are coupled by a bus system that is operated to enable data transfers between each of said plural processing modules and said shared memory at a data transfer rate that is sufficient to prevent conflicts between said processing modules when accessing said shared memory.

10. The method as recited in claim 8, wherein said central processor incorporates a software-driven processing function, comprising the further step of:

operating said central processor to access data from said shared memory and to subject said data to said software driven processing function and to thereafter return said data, after processing, back to said shared memory for access by one of said plural processing modules.

11. An ultrasound system comprising:

a CPU that controls timing of data transfer operations;

a unified memory unit;

a front end data controller that receives lines of digitized ultrasound data and under the timing control of the CPU transfers, on a line by line basis, each received line of ultrasound data to the unified memory unit; and a scan converter that, upon notification that ultrasound data is ready for processing, under the timing control of the CPU repeatedly retrieves a line of ultrasound data from the unified memory unit, converts each line of ultrasound data into video-ready data and transfers, under the timing control of the CPU, the video-ready data to the unified memory unit.

12. The ultrasound system, as set forth in claim 11, further comprising:

a video controller that, under the timing control of the CPU, fetches, on a video line by line basis, the video-ready data from the unified memory unit and causes a display to show an image based on the video-ready data.

13. The ultrasound system, as set forth in claim 11, wherein the scan converter is a dedicated hardware scan converter.

14. The ultrasound system, as set forth in claim 11, wherein the CPU performs a color process on the video-ready data.

15. The ultrasound system, as set forth in claim 11, wherein the unified memory unit comprises a memory and a controller that provides access to and from the memory.

16. The ultrasound system, as set forth in claim 15, further comprising a bus linking the controller, the front end data controller, and the CPU.

17. An ultrasound system, as set forth in claim 11, wherein the CPU allocates the ultrasound data and video-ready data within the unified memory as a whole.

18. The ultrasound system, as set forth in claim 11, wherein the scan converter converts the ultrasound data in the unified memory into video-ready data by getting the ultrasound data from the unified memory on a line by line basis, and for each line received converts the line of ultrasound data into video-ready data for storage in the unified memory, the video-ready data being formed of raster lines.

19. The ultrasound system, as set forth in claim 18, further comprising:

a video controller that causes a display to show an image based on the video-ready data by repeatedly retrieving raster lines from the unified memory.

* * * * *